March 21, 1967     W. J. ROZMUS     3,309,766
COLD PRESSURE WELDING APPARATUS AND METHOD Filed March 27, 1964     2 Sheets-Sheet 2

INVENTOR.
WALTER J. ROZMUS
BY
ATTORNEYS.

United States Patent Office

3,309,766
Patented Mar. 21, 1967

3,309,766
COLD PRESSURE WELDING APPARATUS
AND METHOD
Walter J. Rozmus, Hubbardsville, N.Y., assignor to
Kelsey-Hayes Company, Utica, N.Y.
Filed Mar. 27, 1964, Ser. No. 355,350
22 Claims. (Cl. 29—470.1)

This invention relates generally to the art of cold pressure welding and more specifically to an improved pressure welding mechanism and a welding process.

This invention is particularly concerned with apparatus which can be used to effect a true pressure weld by urging two pressure weldable metal members together under high pressure and in confined conditions. The mechanism is especially directed to performing the so-called "multiple upset" method of welding in which the dies are returned to spaced relationship and the welding steps are repeated until the weld is completed. A more complete disclosure of this multiple upset pressure welding technique is presented in U.S. Patent No. 3,106,013 for Method of Pressure Welding Metals, issued Oct. 8, 1963, to Walter J. Rozmus.

Prior to the invention of the multiple upset technique, it was generally believed that it was impossible to weld fine wire and the like by cold pressure welding. Even though it is now recognized that it is possible to weld fine wires, several problems have inhibited the commercial application of this possibility. In co-pending application, Ser. No. 355,349 filed Mar. 27, 1964 for Die Structure, an improved die which is especially suited for performing the multiple upset process on fine wires is disclosed. In that application, the problems attendant to the die structure itself and the solution of them are described in detail.

In addition to the problems attendant to the dies themselves, the prior art welding apparatuses have made the multiple upset process relatively difficult to perform with fine wires and similar workpieces. The present invention is directed to an apparatus especially adapted for performing cold pressure welding with fine size wires and other similar workpieces and which is preferably, but not necessarily, used in conjunction with die structure of the referenced co-pending application.

In cold pressure welding, it is now conventional to provide a pair of split dies. Each die has a pair of sections, which are movable toward and away from one another, to bring mating surfaces selectively into abutment. Complemental, mating grooves are formed in the mating surfaces to define a workpiece gripping aperture. Customarily, the dies are opened and a pair of workpieces are fed respectively into the mating grooves of each die. The die sections are then closed to grip the workpiece in the workpiece apertures and the two dies are then brought together to effect a mutual upsetting of the workpieces and as a result produce a cold pressure weld.

One problem which has existed prior to this invention is that with very fine wires and similar workpieces, it is extremely difficult to feed the wire into the relatively long workpiece receiving grooves. With relatively fine wire, the grooves are necessarily very shallow. The shallowness of the grooves coupled with the high flexibility of the fine workpiece make it very difficult to guide workpieces into the grooves and, rather, workpieces tend to become positioned between the mating surfaces. When the die sections close, the workpieces are caught between the die sections resulting in flattening of the workpieces and improper positioning that results in either a poor weld or no weld at all.

The present invention overcomes these described difficulties by providing a mechanism which has two die open positions. The first position is only slightly open so that the mating surfaces of the die sections of each die are spaced a distance less than the thickness of the wire or other workpiece. With the dies so positioned, the wire can be fed into the workpiece groove easily because the groove is spaced. Because of the fact that the faces are spaced less than the thickness of the workpiece, the groove, while permitting easy insertion of the workpiece, also serves to guide the workpiece and maintain it in the groove.

The second position of the die structure is a fully open position which permits ready removal of welded workpieces. In this position, the mating surfaces are spaced from one another a distance greater than the thickness of the workpiece and sufficiently far from one another to permit the welded workpieces and the flash formed in the welding operation to be readily removed from the dies.

In the preferred apparatus, a frame is provided which supports a fixed V-block and guides a movable V-block. A position locating cam is provided which in one position holds the movable V-block sufficiently close to the fixed V-block to maintain the dies in their partially open load position. The cam has another position which permits the spring pressure of the die springs to shift the V-blocks sufficiently far apart to permit unloading of the dies.

The apparatus includes a mechanism to move the movable V-block towards the fixed V-block to actuate the dies for welding operation. In the preferred apparatus, this consists of a manually actuated cam and lever system which may be repetitively actuated for repetitively closing the dies in multiple upset operation. When the multiple upset operation is performed, the positioning cam is preferably maintained in the loading position so that the workpieces will not drop out of the workpiece gripping grooves during the indexing of the dies relative to the workpieces.

Accordingly, the principal objects of this invention are to provide a novel and improved apparatus for effecting cold pressure welding and a novel and improved method of effecting such welding.

A more special object of the invention is to provide a welding structure in which the welding dies are selectively movable, when open, to either a loading position or an unloading position.

Another object of this invention is to provide an improved apparatus for holding workpieces during die indexing in a multiple upset operation.

A further object of the invention is to provide an improved die holding and actuating structure.

An additional object of the invention is to provide a cold pressure welding structure which selectively positions dies in either a loading or an unloading position and in which the spacing between the dies in the loading position is adjustable.

Other objects and a fuller understanding of the invention may be had by referring to the following description and claims taken in conjunction with the accompanying drawing in which:

FIGURE 4 is a schematic view of a die in a closed position;

FIGURE 5 is a schematic view of a die in the load position; and,

FIGURE 6 is a schematic view of a die in the unload position.

Figure 1:
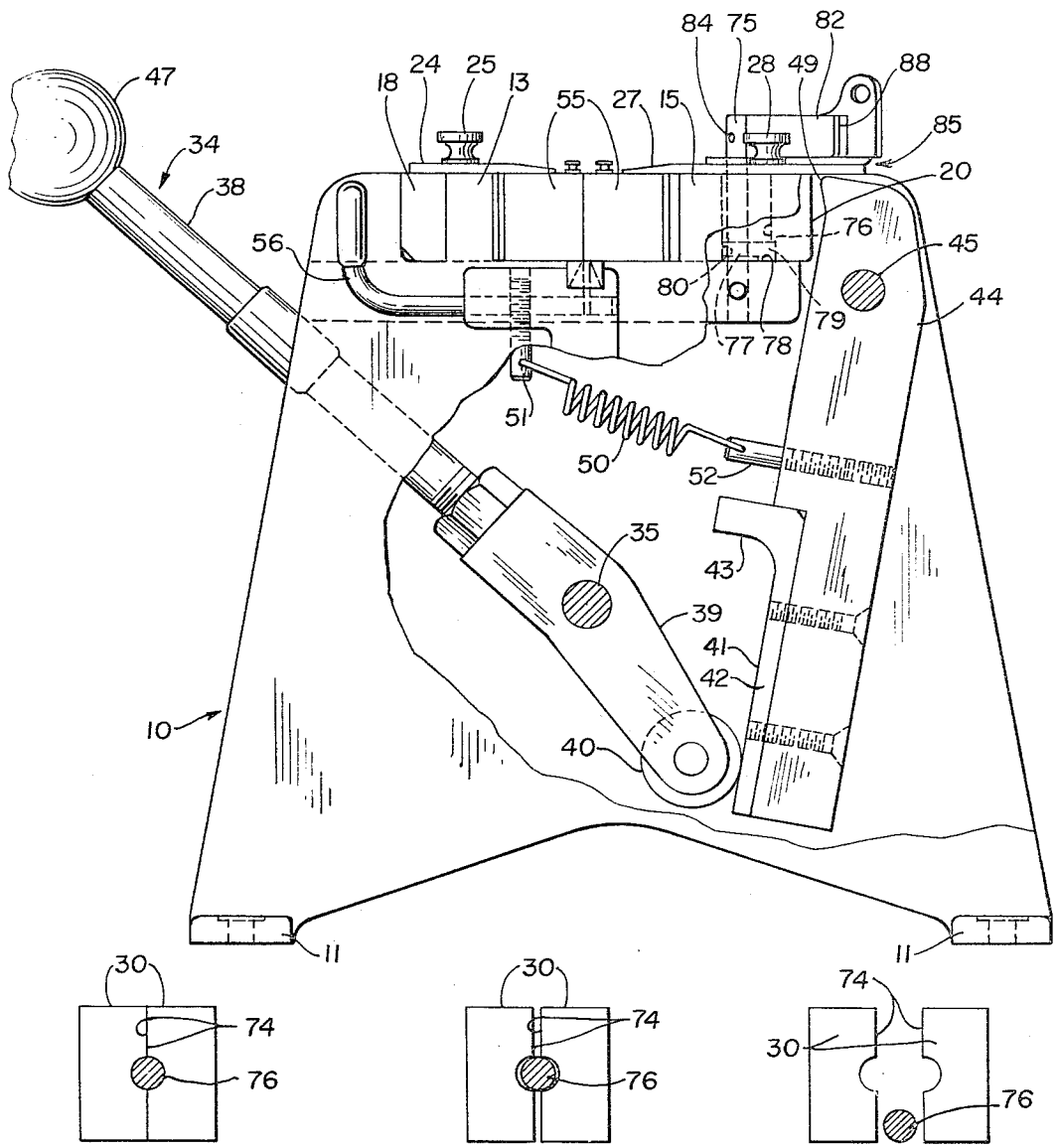
FIGURE 1 is a side elevational view of the welding apparatus of this invention with parts broken away and removed to show portions of the internal construction.

Referring now to the drawings, a welder frame is shown generally at 10. The frame 10 includes four spaced mounting pads 11 for securing and supporting the welding device on a work bench or the like.

Figure 2:
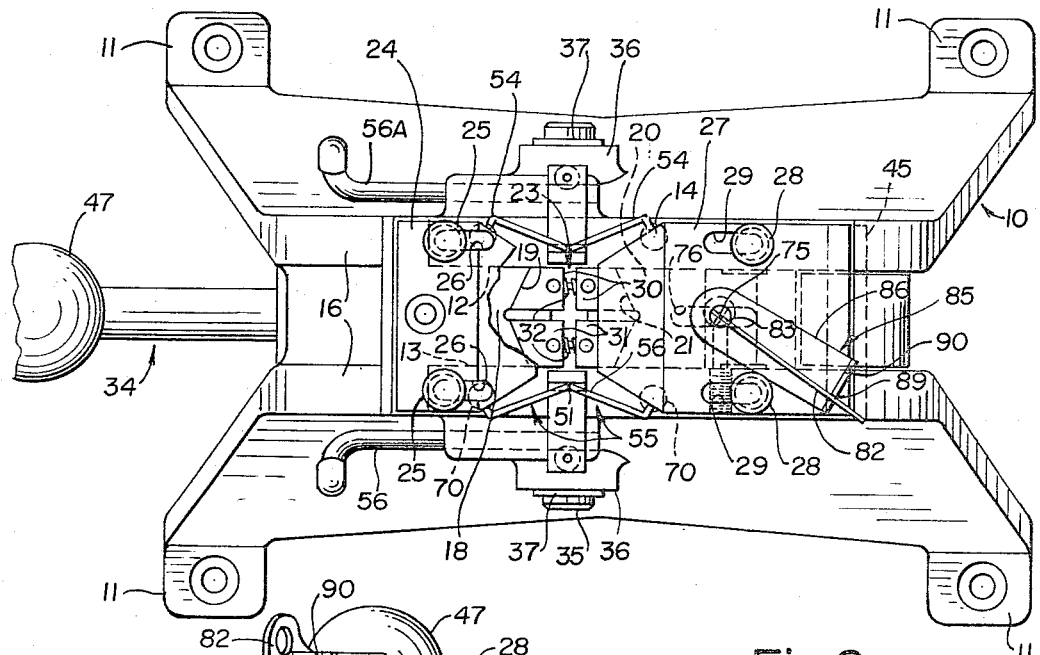
FIGURE 2 is a top plan view of the apparatus with certain parts broken away and removed.

The frame, near the top and toward the forward or lefthand end as seen in FIGURES 1 and 2, includes a pair of spaced, upstanding, fixed block locating projections 12, 13. Rearwardly, to the right as seen in FIGURES 1 and 2, a pair of upstanding movable block locating projections 14, 15 are provided. The projections 12–15 together define the sides of a block and die bed which extends longitudinally of the machine. The base of the bed is defined by a frame surface 78.

Forwardly of the fixed block projections 12, 13 a pair of fixed block restraining projections 16 are provided. A generally T-shaped, removable, fixed block member 18 is positioned on the frame. The cross of the T-shaped fixed block member 18 rests between the upstanding fixed block locating projections 12, 13, respectively, and the restraining projections 16. The leg of the T-shaped fixed block member is positioned in the block and die bed between the projections 12, 13 and includes at its rearward end a V-shaped die actuating channel 19. A movable die actuating block 20 is positioned in the bed between the movable block projections 14, 15. The movable block 20 has a V-shaped die actuating channel 21 oriented towards the fixed block channel 19. A die assembly shown generally at 23 is in the bed positioned between the blocks 18, 20 and abuts the channels 19, 21. The die assembly 23 is located in the bed by the upstanding projections 12–15.

A fixed block and die retaining plate 24 is secured to the upstanding projections 12, 13 by a pair of thumb screws 25. The thumb screws 25 project through longitudinally extending slots 26 formed in the fixed block and die retaining plate 24. The retaining plate 24, then, is longitudinally adjustable to suit a particular fixed block and die disposed in the machine.

A movable block retaining plate 27 similar to the plate 24 is provided. The plate 27 is held in place by suitable thumb screws 28 which respectively project through longitudinal slots 29 in the movable block and die plate 27. The movable block and die plate is, like the fixed block and die plate 24, longitudinally adjustable and serves to restrain the movable block 20 and the die assembly 23 in the frame.

The die assembly 23 may be the die assembly of the above-referenced co-pending application. For details of that assembly, reference is made to the co-pending application. Accordingly, for the present application only a brief description of the die assembly 23 will be made.

The die assembly 23 includes relatively movable die sections 30 of a first die and relatively movable die sections 31 of a second die. Suitable springs are provided, as at 32, to urge the dies and the sections apart.

A lever system is provided for moving the movable block 20 toward the fixed block 18. This block moving assembly includes a manually actuatable lever 34. The manual lever 34 is journaled on a lever shaft 35. The lever shaft 35 is supported in spaced bosses 36, FIGURE 2. Suitable snap rings 37 are in grooves near the ends of the lever shaft 35 to retain the lever shaft in the frame 10. The manual lever 34 includes an arm 38 which is threaded into an actuating member 39. The actuating member is the portion of the manual lever 34 which is journaled on the lever shaft 35.

The actuating member 39 carries a camming roller 40. The roller 40 acts against an actuating surface 41 of a travel limiting shoe 42. The travel limiting shoe 42 has a generally horizontally disposed projection 43 which selectively abuts the roller 40 to limit downward movement of the manual lever 34. The shoe 42 is secured to and carried by a movable block actuating lever 44.

The block lever 44 is pivoted on a support pin 45 near its top. Thus, high mechanical advantage is provided in that actuation knob 47 is carried by the arm 38 a substantially greater distance from the shaft 35 than the roller 40 and similarly the actuation shoe 42 is spaced from the block lever pin 45 a substantially greater distance than a block abutting surface 49 near the top of the block lever 44.

The lever system is normally biased to the position shown in FIGURE 1 of the drawings by a spring 50 which is secured to spring mounting pins 51, 52 respectively connected to the frame 10 and to the block lever 44. Depression of the knob 47 will cause counterclockwise rotation, as viewed in FIGURE 1, of the block lever 44 and resultant die actuating movement of the movable block from the right to the left as viewed in the drawings.

As noted in the introductory portion of the specification, the present device is designed for use in the so-called "multiple upset welding technique." For multiple upsetting, it is desirable to provide a means for retaining the workpiece in position as the die sections are opened and indexed for a subsequent welding step. To this end, a pair of workpiece restraining members 54 are provided for retaining a workpiece received by the die sections 30. A similar pair of workpiece restraining members 55 are provided to coact with a workpiece which projects into the die sections 31.

Because of the substantially identical nature of these restraining members 54, 55 and their actuating mechanism, the restraining members 55 and the actuating mechanism will be described in detail with the corresponding parts of the members 54 identified by the same reference numeral and the letter A added. Thus, restraining member positioning levers 56, 56A are rotatably journaled in projections 57, 57A provided on the sides of the frame 10. An actuating pin 58 is secured to and extends upwardly from a horizontal portion 59 of the actuating lever 56. An upstanding slot 60 is formed in the projection 57 and the pin 58 extends through it. Coaction of the pin 58 with the walls of the slot limits the rotation of the actuating lever 56.

Figure 3:
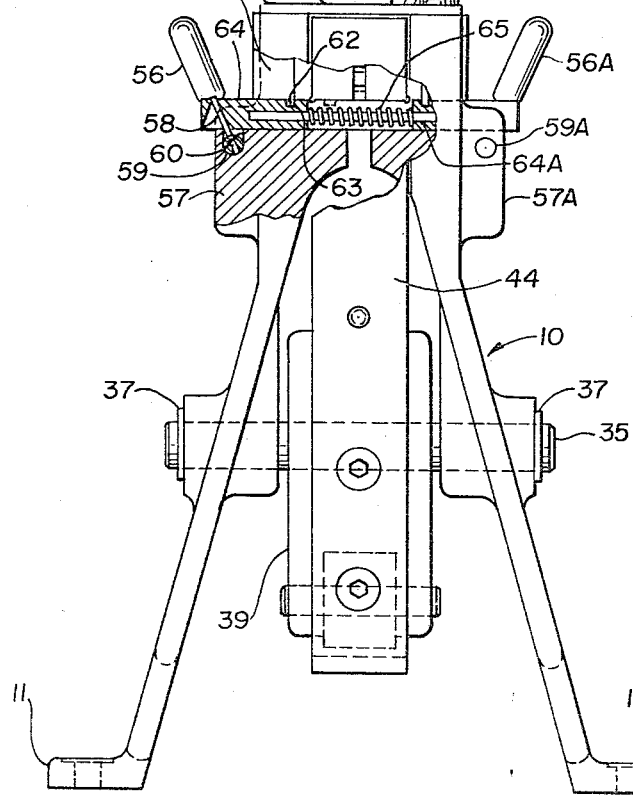
FIGURE 3 is an end elevational view with parts broken away and removed to show the restrainer positioning structure.

The restraining members 55 include downwardly extending projections 62, one of which is shown in FIGURE 3. The projections 62 extend into a longitudinally extending slot 63 formed at the top of a restrainer position control bar 64. The position control bar 64 is engaged by the pin 58 so that rotation of the lever 56 will cause reciprocation of the bar 64 in a path which is transverse to the frame 10.

The bar 64 and its corresponding bar 64A are maintained in spaced-apart relationship by a biasing spring 65 positioned between them. The spring 65 moves the bars 64, 64A outwardly, thereby normally maintaining the levers 56, 56A in their positions shown in the drawings.

The restraining members 55 each include a cylindrical portion 70. The portions 70 are rotatably journaled in vertically disposed positioning member cylindrically contoured slots formed in the block projections 13, 15, respectively. Thus, each of the positioning members is rotatable about the vertical axis of its cylindrical portion 70. The restraining members 55 each include workpiece gripping portions 56 which have rounded end surfaces at 57 for selectively engaging a workpiece.

The workpiece gripping portions 56 are canted inwardly toward the dies so that inward movement of the workpieces due to welding actuation is not inhibited by the restrainers 55. Thus, a workpiece can be pulled inwardly by the dies relative to the restrainers 54 or 55. The spring 65 normally urges the position control bars 64, 64A outwardly and because of the connection of the projections 62 on the restrainers 55 with the slot 63, this outward movement of the bar 64 urges the two restrainers 55 together. Thus, the compressive force of the spring 65 causes the restrainers 54, 55 to retentively grip workpieces while permitting the workpieces to be moved inwardly by die actuation.

When a workpiece is loaded into the die sections 31, the lever 56 will be rotated clockwise as viewed in FIGURE 3, to move the restrainers 55 away from one another and permit ready insertion of the workpiece. Similar actuation of the lever 56A permits loading of a workpiece into the die sections 30. Once a workpiece is appropriately positioned, release of the selected one of the levers permits the restrainers 54, 55 as the case may be, to retentively grip and restrain the workpiece. Similarly when a welding operation is completed, simultaneous clockwise rotation of the lever 56 and counterclockwise rotation of the lever 56A causes all of the workpiece restrainers 54, 55 to release the workpieces and permit facial unloading of the machine.

One of the outstanding advantages of the invention resides in the structure for selectively positioning the dies either in a load position shown in FIGURE 5 where mating surfaces 74 of the die sections 30 are spaced apart a distance less than the diameter of workpiece 76 to be gripped or in a fully open unloading position as shown in FIGURE 6 where the wire may be passed between the dies for removal of the welded workpieces. To this end, an upstanding cam shaft 75 is journaled in the frame. The cam shaft 75 projects through a longitudinally disposed slot 76 formed in the movable block 20. The slot 76 permits reciprocal movement of the block 20 without interference by the cam shaft 75. The shaft 75 carries a cam 77 which is disposed immediately above the frame surface 78 that defines the base of the die and block bed.

The movable block 20 has a cam receiving groove 79. Forward wall 80 of the cam receiving groove 79 is a cam surface against which the cam 77 acts. Rotation of the cam shaft 75 will cause the connected cam 77 to act against the cam surface 80 causing reciprocal movement of the movable block 20 against the action of the die springs. Rotation of the cam shaft 75 is effected by a movable lever 82 which is removably secured to the cam shaft 75.

The lever 82 extends through a lever slot 83 formed near the top of the shaft 75. A removable pin 84 extends through the shaft and the lever 82 to maintain the two in a removably connected condition.

A generally L-shaped load positioner control member 85 surrounds the shaft 75 and is rotatable about it. The load position control 85 has a base 86 which rests against the movable block and die restraining plate 27. The base 86 is shown abutting the lower one, as viewed in FIGURE 2, of the two set screws 28. When the positioner is so located, the dies are in the open unloading position of FIGURE 6. Rotation of the shaft in a counterclockwise direction, as viewed in FIGURE 2, actuates the cam 77 to move the die sections more closely together to the loading position depicted in FIGURE 5. Thus, if the lever 82 is rotated counterclockwise until the base 86 of the position control 85 strikes the other one of the thumb screws 28, the dies will be in the loading position of FIGURE 5.

In the preferred and disclosed arrangement, one can adjust the mechanism selectively and one at a time into any one of a plurality of loading positions. In the particular disclosure, the position control 85 has an upstanding lever engaging portion 88 which is equipped with a pair of horizontally spaced, vertically disposed slots 89, 90. As disclosed, the lever 82 is in the slot 89 for accommodating, for example, wires of from 0.018 inch to 0.40 inch in diameter. If the lever 82 is moved from the slot 89 to the slot 90, the cam is rotated clockwise relative to the position control 85. This adjusts the positioning mechanism so that both the loading and the unloading positions of the dies are more closely spaced than when the lever is in the slot 89. Thus, as an example, when the lever 82 is in the slot 90, wires of from 0.010 to 0.016 inch diameter may be accommodated by the machine.

*Operation*

In operation, the lever 82 is first rotated counterclockwise until the base 86 of the positioner 85 abuts the upper one of the two set screws 28 as seen in FIGURE 2. One then rotates the positioner lever 56 clockwise as seen in FIGURE 3 to separate the workpiece positioner 55. A wire is then fed into the workpiece gripping groove of the die sections 31 until an appropriate and selected portion of the wire extends past the sections 31 toward the sections 30. The lever 56 is then released. At this time the workpiece positioners 55 are holding the first workpiece in position. The lever 56A is rotated counterclockwise as seen in FIGURE 3. A second workpiece is fed into the die sections 30 until it projects past them toward the die sections 31. The lever 56A is then released so that the positioner 54 will grip the second workpiece and hold it in the desired position for welding.

As a next step, the manual lever 34 is depressed causing the block lever 44 to rotate counterclockwise and urge the movable block 20 toward the fixed block. This moves the cam surface out of engagement with the cam 77 so that the cam 77 is ineffectual during the actual welding. As the movable block moves forwardly, the die sections 30, 31 are first brought together so that the workpieces are gripped as shown in FIGURE 4. Continued forward movement of the movable block 20 will cause the die sections 30, 31 to slide relative to the block channels 19, 21 moving the two dies together and causing a welding upset of the workpieces.

When the lever or handle 34 is released, the spring 50 will return the actuating mechanism to its position shown in the drawings. Action of the die springs will cause the die sections to separate and the movable block to move rearwardly until the cam surface 80 again abuts the cam 77. As this die opening is occurring, the workpiece positioners 54, 55 restrain the respective workpieces against movement and, therefore, the die sections are indexed relative to the workpieces. The lever 34 is again depressed so that the die sections close and grip the workpieces and then the dies move towards one another to effect the second step in the multiple upset process. Actuation of the lever 34 is repeated until the weld is completed.

Once the weld has been completed, the lever 82 is rotated clockwise until the base 86 of the positioner 85 strikes the lower one of the two set screws 28 as shown in FIGURE 2. At this point the positioner control levers 56, 56A are rotated toward one another and the welded workpieces are lifted out of the mechanism.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A device for effecting a weld comprising:
 (a) a frame structure;
 (b) a workpiece gripping die carried by the frame structure and having relatively movable sections, the sections having mating faces, each mating face having a recess therein defining a workpiece gripping opening when the faces are in abutment;
 (c) die actuation means connected to the frame structure and operably connected to the die for selectively closing the die in workpiece gripping movement;
 (d) die positioning means connected to the frame structure and operably connected to the die for selectively positioning the die sections one position at a time in loading and unloading positions;
 (e) said die sections when in the loading position having the mating faces spaced a distance less than the lateral dimension of said workpiece gripping opening to define a loading opening in said die whereby a workpiece may be fed facilely longitudinally of the workpiece axis into said loading opening but not between the mating faces; and, (f) said die sections when in the unloading position having the mating faces spaced a distance greater than the lateral dimension of said workpiece gripping opening whereby to facilitate removal of a workpiece.

2. The device of claim 1 wherein the positioning means includes a rotatable eccentric cam and wherein the cam acts against a portion of the actuation means to position the portion of the actuation means and thereby position the die selectively in its loading and unloading positions.

3. The device of claim 1 wherein the positioning means is adjustable to provide a selected one of a plurality of loading positions appropriate for the diameter of a workpiece.

4. A device for effecting a weld comprising:
(a) a frame structure;
(b) first and second workpiece gripping dies mounted on the frame structure, each die having relatively movable sections, the sections of each die including mating faces, each mating face having a recess therein defining a workpiece gripping opening when the faces are in abutment;
(c) die actuation means connected to the frame structure and operably connected to each of the dies for selectively closing the dies in workpiece gripping movement and thereafter moving the dies toward one another for effecting a weld;
(d) a die positioning means connected to the frame structure and operably connected to the dies for selectively positioning the sections of each die one at a time in loading and unloading positions;
(e) said sections of each die when in the loading position having the mating faces spaced a distance less than the lateral dimension of said workpiece gripping opening to define a loading opening in each die whereby a workpiece may be fed facilely longitudinally of the workpiece axis into each said loading opening but not between the mating faces; and,
(f) said sections of each die when in the unloading position having the mating faces spaced a distance greater than the lateral dimension of said workpiece gripping opening whereby to facilitate removal of a pair of welded workpieces.

5. The device of claim 4 wherein:
(a) the actuation means includes a movable block actuable to close said dies;
(b) said block includes a cam surface; and,
(c) said positioning means includes an eccentric cam engageable with the cam surface to provide selectively the loading and unloading positions.

6. In combination with the device of claim 4, first and second spaced workpiece restraining means positioned with the dies therebetween and each associated with a like numbered die for respectively restraining first and second workpieces in a given position whenever the mating faces of the associated die are separated.

7. A device for effecting a weld comprising:
(a) a frame structure;
(b) a workpiece gripping die mounted on the frame structure and having relatively movable sections, the die sections having mating faces with recesses therein defining a workpiece gripping opening when said faces are in abutment;
(c) actuation means connected to the frame and operably connected to the die for selectively closing the die in workpiece gripping movement;
(d) a workpiece restraining member pivotally mounted on the frame structure for rotation about an axis spaced from said workpiece opening, said device including a coacting surface, said restraining member being positioned to cooperate with said coacting surface to grip a workpiece projecting from said workpiece opening;
(e) said restraining member being pivotal from a workpiece gripping position to a retracted position; and,
(f) means biasing said restraining member toward said gripping position.

8. The device of claim 7 wherein a means is movably connected to the frame and operably connected to the restraining member for shifting the restraining member selectively from the abutting position to the retracted position.

9. The device of claim 7 wherein said coacting surface is provided by a second restraining member with said restraining members disposed on opposite sides of an extension of the axis of said opening.

10. The device of claim 9 wherein each of said members has a coacting surface and said surfaces are against a workpiece when in the gripping position and each has a portion adjacent said coacting surface which is skew with respect to the axis of the workpiece slanting from the coacting surface away from both the surface and the die.

11. In combination with the device of claim 1:
(a) a workpiece restraining member pivotally mounted on the frame structure for rotation about an axis spaced from said workpiece opening, said device including a coacting surface, said restraining member being positioned to cooperate with said coacting surface to grip a workpiece projecting from said workpiece opening;
(b) said restraining member being pivotal from a workpiece gripping position to a retracted position; and,
(c) means biasing said restraining member toward said gripping position.

12. In a welding device having a frame defining a bed, a pair of dies positioned in the bed, each said die having a workpiece opening, and means to actuate the dies in weld closing movement, the combination of:
(a) a first pair of restraining members mounted on the frame to one side of the dies and a second pair of restraining members mounted on the frame on the opposite side of the dies, whereby said dies are positioned between the two pairs of restraining members;
(b) each of said restraining members being pivotally mounted on the frame with the members of each pair adapted to grip and restrain movement of a workpiece carried in the workpiece opening of one of said dies;
(c) first and second restraining positioner bars reciprocally mounted on the frame in spaced relationship;
(d) a spring interposed between the bars and biasing the bars away from one another;
(e) each bar and each restraining member of a like numbered pair having a coacting projection and groove whereby reciprocation of each bar causes pivotal movement of the like-numbered restraining members; and,
(f) first and second restraining member control levers pivotally mounted on the frame and operatively connected to the first and second bars respectively whereby rotation of one of the levers will cause reciprocal movement of the like-numbered bar against the action of said spring.

13. In a welding device having a frame defining a bed, first and second split dies positioned in the bed and each including a workpiece gripping opening, and means to actuate the dies in weld closing movement, the combination of:
(a) a first pair of restraining members mounted on the frame near and associated with the first die and a second pair of restraining members mounted on the frame on the opposite side of the frame and associated with the second die;

(b) each of said restraining members being pivotally mounted on the frame with the members of each pair adapted to grip and restrain movement of a workpiece carried in the workpiece gripping opening of the associated die;

(c) first and second restraining positioner bars reciprocally mounted on the frame in spaced relationship;

(d) each bar and like numbered restraining member having a coacting projection and groove forming slidable connections therebetween whereby reciprocation of each bar causes pivotal movement of the like-numbered restraining members;

(e) a spring interposed between the bars and biasing the bars and connected members away from one another;

(f) first and second restraining member control levers pivotally mounted on the frame, the first and second levers each having projections, the projections engaging the first and second bars respectively whereby rotation of one of the levers will cause reciprocal movement of the like-numbered bar against the action of said spring thereby moving the connected pair of restraining members.

14. A welding mechanism comprising:

(a) a frame structure having a surface defining the base of a bed and a plurality of upstanding projections defining the sides of the bed;

(b) a fixed block removably secured in the bed and including a die actuating channel;

(c) a movable block reciprocally mounted in the bed and including a die actuating channel oriented toward the fixed block channel;

(d) a pair of sectioned dies mounted in the bed between said channels and including biasing means organized to separate the dies and sections thereof;

(e) a fixed block and die retaining means secured to the frame and overlying the fixed block and portions of the dies to maintain them in said bed;

(f) a movable block and die retaining means secured to the frame and overlying the movable block and portions of the dies to maintain them in the bed;

(g) lever means pivotally connected to the frame for selectively urging the movable block toward the fixed block in die closing and actuating movement;

(h) a die positioning assembly mounted on the frame and including a cam supporting shaft rotatably mounted in the frame and a lever secured to the shaft;

(i) said movable block including a cam groove with one surface of the groove forming a cam surface;

(j) an eccentric cam mounted on said shaft and selectively abuttable against said cam surface; and, (k) a die positioner control means, said die positioning assembly including a portion adjustably connectable to said control means to limit adjustably rotational movement of said cam about the axis of said shaft.

15. The device of claim 14 wherein said lever means comprises:

(a) a first lever having a movable block abutting projection and a pivot near said projection;

(b) said first lever having a wear shoe carried at its end remote from said projection and spaced from the pivot a distance substantially greater than the projection; and, (c) a second lever pivotally connected to the frame and carrying a handle with an actuating end, said second lever having a shoe abutting roller at its end remote from the handle, the actuating end of said handle being spaced from the second lever pivot a substantially greater distance than said roller.

16. A welding mechanism comprising:

(a) a frame structure having a surface defining the base of a bed and a plurality of upstanding projections defining the sides of the bed;

(b) a fixed block removably secured in the bed and including a die actuating channel;

(c) a movable block reciprocally mounted in the bed and including a die actuating channel oriented toward the fixed block channel;

(d) a pair of sectioned dies mounted in the bed between said channels and including biasing means organized to separate the dies and sections thereof;

(e) a fixed block and die retaining plate secured to certain of the upstanding frame projections and overlying the fixed block and portions of the dies to maintain them in said bed;

(f) a movable block and die retaining plate secured to other of said upstanding projections and overlying the movable block and portions of the dies to maintain them in the bed;

(g) lever means pivotally connected to the frame and including a handle for selectively urging the movable block toward the fixed block in die closing and actuating movement;

(h) a die positioning assembly mounted on the frame and including a cam supporting shaft disposed transversely with respect to the base of said bed and rotatably mounted in the frame;

(i) said movable block including a cam groove adjacent the base of the bed with one surface of the groove forming a cam surface;

(j) an eccentric cam mounted on said shaft and selectively abuttable against said cam surface;

(k) said shaft having a lever slot formed therein near the end of the shaft opposite said bed, a lever disposed in said slot and removably secured therein, said movable block plate being around said shaft and between said lever and said movable block;

(l) a load positioner control having a portion surrounding said shaft between said lever and said plate, said control including an upstanding portion having a plurality of slots adapted to receive said lever one slot at a time; and, (m) means projecting above said plate and adapted to limit rotational movement of said positioner control and thereby said cam about the axis of said shaft.

17. The device of claim 4 wherein the positioning means includes a rotatable eccentric cam and wherein the cam acts against a portion of the actuation means to position the portion of the actuation means and thereby position the dies selectively in their loading and unloading positions.

18. The device of claim 4 wherein the positioning means is adjustable to provide a selected one of a plurality of loading positions appropriate to the diameter of a workpiece.

19. In combination with the device of claim 1, a workpiece restraining means positioned adjacent the die for restraining a workpiece in a given position whenever the sections are separated.

20. The device of claim 6 wherein each said restraining means comprises a pair of restraining members each pivotally mounted on the frame and positioned to grip a workpiece therebetween, and spring means operatively connected to the restraining members for biasing the restraining members against the workpiece.

21. The method of effecting a true pressure weld with a pair of dies each having relatively movable sections, the sections of each die having mating faces with recesses therein defining a workpiece gripping opening when the faces are in abutment comprising the steps of:

(a) separating the sections of each die from one another such that the mating faces of corresponding sections are spaced a distance less than the thickness of a workpiece to be welded, the recesses of corresponding sections defining a workpiece loading opening in this position;

(b) inserting a pair of workpieces respectively in the workpiece loading opening of each die;

(c) closing the die sections to grip the workpiece and thereafter moving the dies toward one another in a welding actuation to upset portions of the workpiece and effect a weld;

(d) thereafter opening the sections of each die such that the mating faces of corresponding sections are spaced a distance greater than the thickness of the workpiece; and, (e) thereafter removing the welded workpieces.

22. The method of claim 21 comprising re-separating the sections of each die from one another after said welding actuation a distance less than said workpiece thickness, moving the dies away from one another while the sections are so separated, closing the sections on one another a second time, repeating the welding actuation, and thereafter opening the sections a distance greater than the thickness of the workpiece.

References Cited by the Examiner

UNITED STATES PATENTS

| | | | |
|---|---|---|---|
| 468,825 | 2/1892 | Peacock | 269—172 |
| 557,457 | 3/1896 | Thompson | 269—169 |
| 2,223,323 | 11/1940 | Koch | 269—203 |
| 3,044,328 | 7/1962 | Zysk | 228—3 |

JOHN F. CAMPBELL, *Primary Examiner.*

M. L. FAIGUS, *Assistant Examiner.*